Oct. 25, 1949.   M. A. ELLIOTT   2,485,579
FLUID INSPECTION APPARATUS
Filed March 1, 1946   3 Sheets-Sheet 1
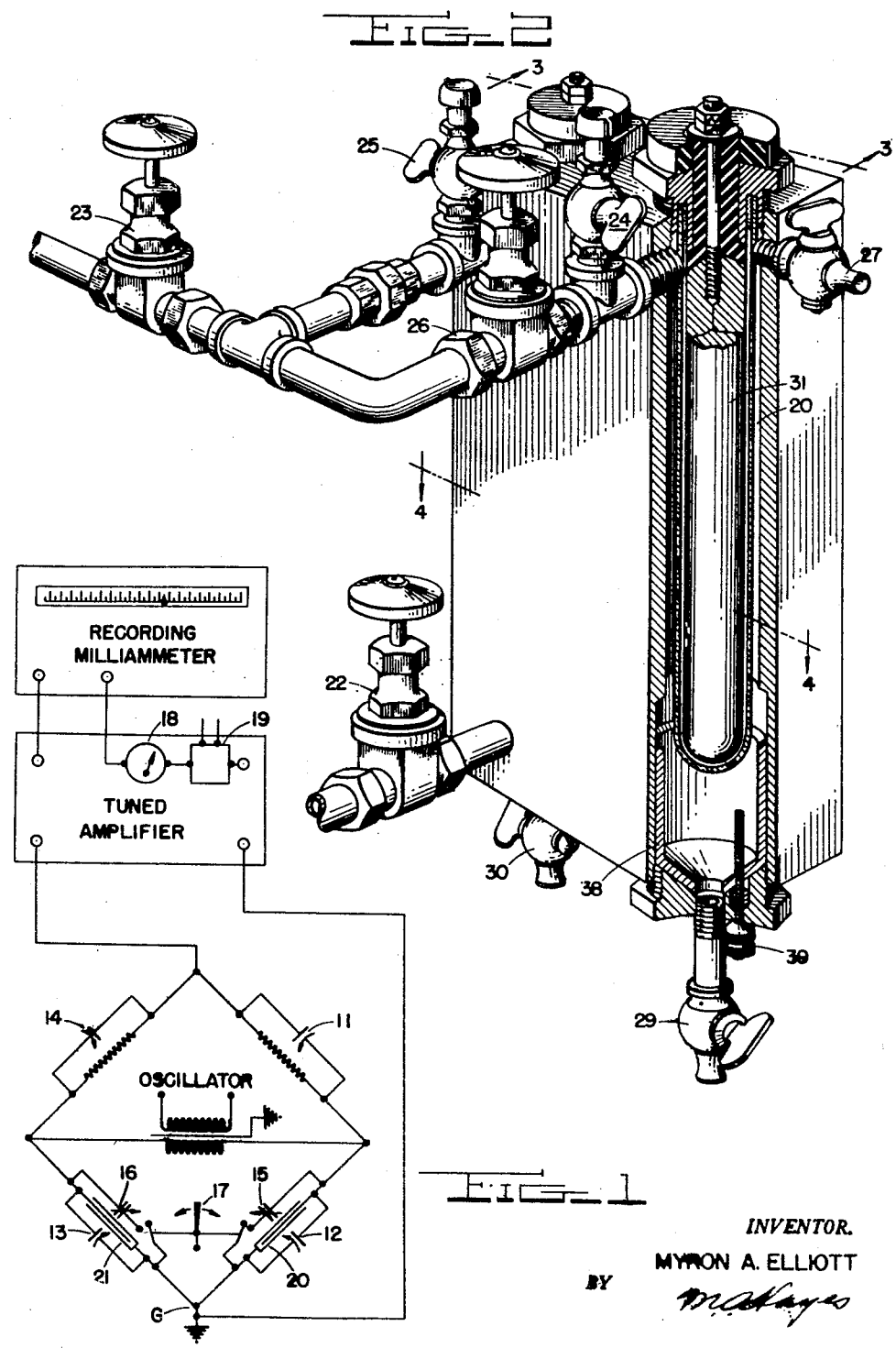
INVENTOR.
MYRON A. ELLIOTT
BY
*M. A. Hayes*
ATTORNEY Oct. 25, 1949.　　　　M. A. ELLIOTT　　　　2,485,579
FLUID INSPECTION APPARATUS
Filed March 1, 1946　　　　　　　　　　　　3 Sheets-Sheet 2
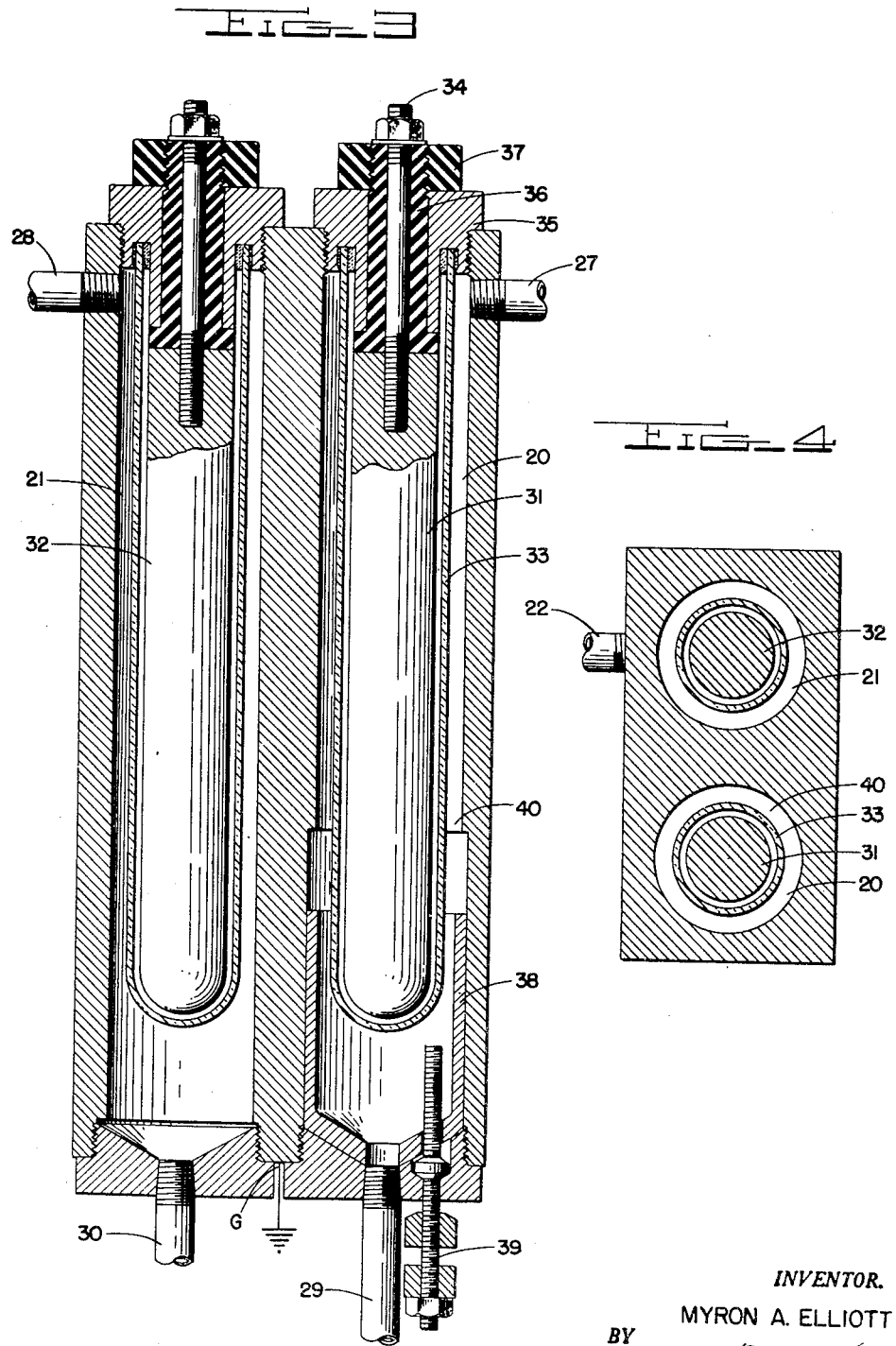
INVENTOR.
MYRON A. ELLIOTT
BY
M. O. Hayes
ATTORNEY

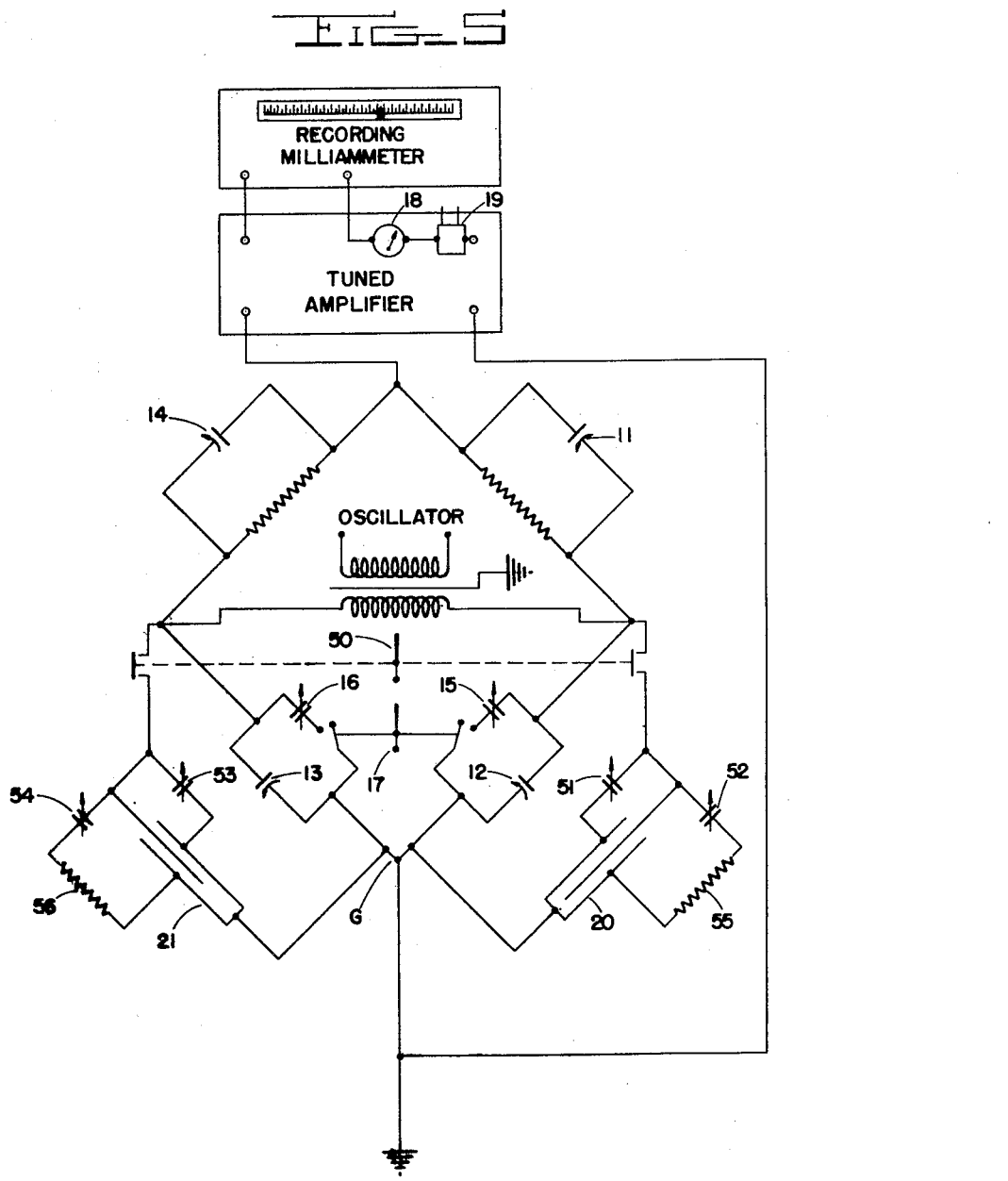

Patented Oct. 25, 1949

2,485,579

UNITED STATES PATENT OFFICE 2,485,579

FLUID INSPECTION APPARATUS

Myron A. Elliott, Washington, D. C.

Application March 1, 1946, Serial No. 651,411

1 Claim. (Cl. 175—183)

(Granted under the act of March 3, 1883, as amended April 30, 1928; 370 O. G. 757)

My invention relates to a method and apparatus for electrical inspection of electrically non-conductive liquids for the presence of polar materials, and particularly to an electrical device for quickly and automatically determining the amount of water contained in organic fluids under conditions of continuous flow.

It is an object of my invention to provide a method for detecting the presence of polar materials, i. e., molecules having appreciable dipole moment, in electrically non-conductive liquids.

It is a second object of my invention to provide a method for detecting the presence of non-polar materials in electrically non-conductive polar liquids.

It is another object of my invention to provide an apparatus whereby the presence of water in organic fluids under conditions of continuous flow is indicated in order that the flow may be arrested or the stream freed of water upon the detection of its presence.

It is a further object of my invention to provide a means whereby an instantaneous and continuous record may be made of the proportions of sea or fresh water in organic fluids under conditions of continuous flow. The water may be in solution, emulsion, or suspension, and in concentrations of a small fraction of one per cent or larger.

Other objects and advantages of my invention will in part be obvious and in part appear hereinafter.

My invention comprises an apparatus and a method for detecting polar materials in electrically non-conductive liquids by following changes in dielectric constant of the mixtures as the percentage of the electrically polar material changes and comprises an apparatus including the features of construction, combination of elements and arrangements of parts and a method involving the sequence of steps and their relationship each to the other as will be hereinafter set forth.

A preferred embodiment of my invention will be described herewith, and reference will be made to the appended drawings in which:

Figure 1 is a diagram, partially in block form and partially schematic, of the electrical circuit employed;

Figure 2 is a perspective view of the fluid testing unit and a cut-away sectional view of one of the cells and electrode;

Figure 3 is a sectional view of the fluid testing unit taken along the line 3—3 of Figure 2;

Figure 4 is a sectional view of the fluid testing unit taken along the line 4—4 of Figure 2;

Figure 5 is a diagram, partially in block form and partially schematic, of an alternative circuit which may be employed.

In its preferred form, the apparatus includes a radio or audio frequency capacitance bridge together with a suitable oscillator, an amplifier, and a recording milliammeter as an indicator, as shown in Figure 1. The oscillator may be operated at any frequency between about one kilocycle and about five thousand kilocycles, with bridge constants chosen accordingly. Trimmer condensers 11, 12, 13 and 14 are used to balance the bridge circuit, and condensers 15 and 16 are used as a standard capacitance while standardizing the amplifier gain. The two-way switch 17 provides a means for selecting either condenser 15 or 16, as desired. Milliammeter 18 is used to indicate the degree of unbalance of the bridge circuit, and relay 19 is provided as a means for operating a signalling system. The recording milliammeter provides a means for plotting a continuous record of the water content of a liquid under continuous flow.

Referring to Figures 1 and 3, the apparatus shown includes an electrically grounded block G of heat conductive and electrically conductive metal containing two identical cells 20 and 21 for holding organic liquids, cell 20 being used to contain a water-free liquid as a standard whose properties are the same as those of the liquid being examined in cell 21.

Referring to Figures 2 and 3 for a preferred embodiment of the apparatus, inlet valve 22 admits the liquid to cell 21 to be tested from a flow line and outlet valve 23 returns the liquid to the flow line. Inlet valve 24 is used to introduce the water-free liquid to cell 20. When a comparison of fluids under static conditions is desired, inlet valve 25 is used to admit liquids to be tested to cell 21, and valve 26 is used to open or close the flow path between cells 20 and 21. Valves 27 and 28 are used to permit the escape of any air or other gases which may have been trapped above the liquids in cells 20 and 21 respectively, and valves 29 and 30 are used to drain the liquids from cells 20 and 21 respectively.

Electrodes 31 and 32 each form one plate of a condenser, the second plate of each being formed by the cavity walls of cells 20 and 21, respectively. Electrode 31 is preferably identical to electrode 32 in construction and consists of an electrically conductive core 31, such as aluminum, enclosed within an insulating envelope 33. The terminal 34 of the electrode passes through the metal cap 35, but is electrically insulated from it by insulating materials 36 and 37. Insulator 36 also electrically separates the electrode 31 from the metal cap 35, which is threaded to provide connection to the cavity of cell 20. Insulators 36 and 37 may be made of any material which will not be easily affected by the fluid under test. Sleeve 38 is movable along the longitudinal axis of the cavity wall of cell 20 by the screw 39, and is provided in order to match the capacitances of the two test cells 20 and 21.

Referring specifically to Figures 3 and 4, the space between the envelope 33 of the electrode 31 and the cavity wall of cell 20 will contain the standard fluid as a dielectric during a test, while cell 21 will contain the liquid under examination. The two cells are formed in one block for the purpose of maintaining temperature balance of the contained liquids.

In order to describe fully the operation of the apparatus, let it be assumed that a test is to be made on an oil flowing through a pipe line. Referring to Figure 2, the condenser unit is attached to the pipe line while intake valve 22 and outlet valve 23 are closed. A water-free oil having the same properties as the oil to be tested is introduced into both cells to fill them and displace any trapped air through valves 27 and 28. The cells are then ready for the preliminary balance of the capacitance bridge, the two cells forming opposite arms of the bridge circuit.

Since the dielectric constants of organic liquids vary with temperature, the two cells are formed in one block to compensate for temperature variations, and their close proximity assures the condition of substantially equal temperature in both cells.

Referring to Figure 3, the electrode 31, which is identical to electrode 32, is made of aluminum or other electrically conductive material and is enclosed in an insulating envelope 33 which prevents the passage of direct current but permits passage of alternating current through the dielectric 40 contained between the plates of the condenser. Thus, only an alternating current field is developed and measurements of electrical capacitance can be made without appreciable interference from direct current conductivity due to water condensation on the insulation supports between electrode 31 and metal cap 35.

Referring to Figure 1, when the bridge circuit is balanced, the milliammeter 18 will show no deflection. To obtain this condition, trimmer condensers 11 and 12 are adjusted until the meter reads zero, and, if necessary, trimmer condensers 13 and 14 can also be employed to make this zero adjustment. Figures 2 and 3 show a sleeve 38 mechanically variable by screw 39 whereby the capacitance of cell 20, hereinafter called the balancing cell, may be adjusted to equal the capacitance of cell 21, hereinafter called the measuring cell.

Referring again to Figure 1, the next step in setting up the apparatus for operation involves the standardization of amplifier gain. The water-free liquid contained in measuring cell 21 is now replaced by a similar liquid containing, for example, one per cent water, thereby causing a change in the electrical capacitance of the containing cell, thus upsetting the balance of the capacitance bridge, and causing a current to flow through the amplifier, tuned to the frequency of the oscillator, and through the milliammeter 18 which is located in the output circuit of the amplifier. A deflection corresponding to the degree of unbalance of the bridge circuit and to the amplifier gain is registered on the meter 18. The amplifier gain is now adjusted to give, for example, a full-scale deflection on meter 18, and thereby set a standard for amplifier gain. The fluid in the measuring cell 21 is then replaced by water-free liquid as contained in the balancing cell 20, and variable condenser 16, which is introduced across the measuring cell 21 by use of the two-way switch 17, is adjusted to give full-scale deflection on meter 18. Thus, condenser 16 is set at a value which corresponds to one per cent water contained in the liquid in the measuring cell 21. Variable condenser 15, which is shunted across the balancing cell 20 by use of the two-way switch 17, can be set to correspond to the same water content as condenser 16 by following the procedure as given above but employing the balancing cell 20 in place of the measuring cell 21.

Having both condensers 15 and 16 set at a desired value, the only requirement for checking amplifier gain is that the bridge circuit be balanced. This may be accomplished by using identical liquids in both cells 20 and 21, or by adjusting trimmer condenser 11 or condenser 12 to effect the balance. Once the bridge circuit is balanced, either condenser 15 or 16 may be employed as the standard for full scale deflection of meter 18.

An alternative method for obtaining the preliminary zero adjustment and for standardizing and checking amplifier gain is shown schematically in Figure 5, wherein the use of electrical equivalents of the mechanical sleeve 38 and its adjustment screw 39 in cell 20 may advantageously be employed in both cells 20 and 21 and thereby permit the use of identical construction in both cells and eliminating all mechanical moving parts. Another advantage in the method shown in Figure 5 is the use of the two way switch 50 which simultaneously inserts or removes both cells 20 and 21 from the bridge circuit and by which action the standardization and checking of amplifier gain is accomplished with more accuracy and less manipulation, as will become apparent in the following description.

The preliminary balance or zero adjustment of the bridge is accomplished by first removing both cells 20 and 21 from the circuit by use of the two-way switch 50 and adjusting trimmer condensers 11, 12, 13, and 14 to obtain zero deflection on meter 18. Cells 20 and 21 are then filled with identical water-free liquids and switch 50 moved so that both cells are placed in the bridge circuit. Condensers 51 and 52 are set at some low values and condensers 53 and 54 are adjusted to restore the zero balance as indicated by no deflection of meter 18. It is apparent that condensers 53 and 54 could equally well be first set at the low values of condensers 51 and 52 and the zero balance be obtained by adjusting condensers 51 and 52. These electrical adjustments have replaced the mechanical sleeve 38 and its adjustable screw 39 as described in the preceding example and have the additional advantage of correcting for power losses through the use of the series combinations of condenser 52 and resistor 55 for cell 20 and the condenser 54 and resistor 56 for cell 21.

Having the bridge circuit thus blanced, the procedure involved in standardizing amplifier gain is as follows: The water-free liquid in cell 20 is replaced with a similar liquid which contains, for example, one per cent water, and the gain of the amplifier is adjusted to give, for example, full scale deflection on meter 18. Both cells 20 and 21 are now removed from the bridge circuit through use of switch 50, and switch 17 is manipulated to place condenser 15 in the circuit. Condenser 15 is then adjusted to give full scale deflection of meter 18 and is thereby set to correspond to one per cent water contained in the liquid in cell 20. Condenser 16 can also be set to correspond to the same water content as condenser 15 by following the procedure as given above but employing cell 21 in place of cell 20. Thus the calibration and checking of amplifier gain is based upon electrical equivalents of a fixed amount of water in a given liquid, and the time required to rebalance the bridge circuit whenever a check of amplifier gain is desired is eliminated.

Referring now to Figure 3, the balancing cell 20 is filled with water-free oil the same as that which is to be tested, and the measuring cell 21 is opened to the flow line containing the liquid to be examined. Valve 28 for the measuring cell 21 is opened to allow the escape of any air which may have been trapped in the cell and is closed when the cell is completely filled with liquid.

It should be noted that tests may be performed on liquids which are not under continuous flow. Valves 24 and 25 in Figure 2 may be fitted with funnels or other devices for the introduction of liquids into cells 20 and 21 respectively.

Consider now that the balancing cell 20 contains a water-free oil the same as that flowing through the measuring cell 21. Having previously balanced the bridge circuit, an unbalance is now produced because of the change in dielectric constant of the contaminated liquid in the measuring cell 21, and the potential produced is directly proportional to the degree of unbalance in the bridge circuit which, in turn, is directly porportional to the water content of the liquid in the measuring cell 21. This potential, at the frequency of the oscillator producing it, is amplified and used to deflect the needle of a milliammeter 18 and/or to operate the recording milliammeter.

Since the deflection of the milliammeter 18 is directly proportional to the percentage of water in the fluid under observation, a relay 19 connected in series with the meter 18 can be so adjusted that a desired maximum value of water content in a liquid will produce a current sufficient to operate the relay 19 and close a circuit to a signalling system.

Detection and accurate measurements of polar materials in non-polar liquids wherein the difference between their respective dielectric constants are in the order of about fifty per cent or greater can be made according to my invention. Thus, the control measurements of polar materials such as water or alcohols in ethers, esters, oils and, in fact, any non-conductive organic liquid are obtainable. For some specific applications the fluid testing device may advantageously be separated into two distinct units. In testing the contents of a large pipe line, for example, it may be more convenient to separate the units and wholly or partially immerse them in the fluid. It will be evident to those skilled in the art that a revision in the construction and arrangement of inlets and outlets of the cells may be desirable. It should be noted that, although I have described the use of my invention in combination with a capacitance bridge circuit, other means for measuring electrical capacitance such as other types of bridges or tuned resonating circuits in conjunction with vacuum tube voltmeters, for examples, may conveniently be used.

The above detailed description of my invention is merely an illustration of the operating principles involved and it is not intended that my invention be limited other than as defined by the scope and limitations of the appended claim.

The invention described herein may be manufactured and used by or for the Government of the United States of America for governmental purposes without the payment of any royalties thereon or therefor.

What is claimed is:

A dual condenser for detecting the presence of electrically polar substances in electrically non-conductive liquids comprising a heat conductive and electrically conductive block having two adjacent parallel cylindrical cavities therein joined continuously along their length by the heat conductive block material, the cavities having surfaces acting as condenser electrodes, a cylindrical electrode positioned coaxially in each cavity, solid dielectric means sheathing each cylindrical electrode, and conduit means formed in the block communicating with each cavity for passing liquid therethrough.

MYRON A. ELLIOTT.

REFERENCES CITED

The following references are of record in the file of this patent:

UNITED STATES PATENTS

| Number | Name | Date |
|---|---|---|
| 995,728 | Sloan | June 20, 1911 |
| 1,701,331 | Merrill | Feb. 5, 1929 |
| 2,071,607 | Bjorndal | Feb. 23, 1937 |
| 2,108,580 | Drake et al. | Feb. 15, 1938 |
| 2,129,008 | Kater | Sept. 6, 1938 |
| 2,133,483 | Shaw | Oct. 18, 1938 |
| 2,192,062 | Hansell et al. | Feb. 27, 1940 |
| 2,266,114 | Bartlett | Dec. 16, 1941 |
| 2,304,448 | Fletcher | Dec. 8, 1942 |
| 2,428,898 | Waymouth | Oct. 14, 1947 |